United States Patent
Zhou et al.

(10) Patent No.: US 8,621,555 B2
(45) Date of Patent: Dec. 31, 2013

(54) ACCESS CONTROL METHOD AND SYSTEM FOR PACKET DATA NETWORK, PCRF ENTITY

(75) Inventors: Xiaoyun Zhou, Shenzhen (CN); Zaifeng Zong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 296 days.

(21) Appl. No.: 12/997,509

(22) PCT Filed: Jun. 3, 2009

(86) PCT No.: PCT/CN2009/072109
§ 371 (c)(1),
(2), (4) Date: Dec. 10, 2010

(87) PCT Pub. No.: WO2009/149642
PCT Pub. Date: Dec. 17, 2009

(65) Prior Publication Data
US 2011/0099604 A1   Apr. 28, 2011

(30) Foreign Application Priority Data

Jun. 11, 2008   (CN) .......................... 2008 1 0100442

(51) Int. Cl.
*G06F 17/00*   (2006.01)
(52) U.S. Cl.
USPC ........... 726/1; 726/3; 726/13; 726/25; 726/29
(58) Field of Classification Search
USPC ............................................................ 726/1
See application file for complete search history.

(56) References Cited

U.S. PATENT DOCUMENTS

| 8,042,148 B2 * | 10/2011 | Andreasen et al. ................ 726/1 |
| 8,238,267 B2 * | 8/2012  | Dwyer et al. .................. 370/254 |

(Continued)

FOREIGN PATENT DOCUMENTS

| CN | 101119211 A | 2/2008 |
| CN | 101159563 A | 4/2008 |
| CN | 101286915 A | 10/2008 |
| WO | WO 2007/026268 A1 | 3/2007 |

OTHER PUBLICATIONS http://www.quintillion.co.jp/3GPP/Specs/23203-811.pdf; (Mar. 2008).*

(Continued)

*Primary Examiner* — Kambiz Zand
*Assistant Examiner* — Yonas Bayou
(74) *Attorney, Agent, or Firm* — Clark & Elbing LLP

(57) ABSTRACT

An access control method and system for packet data network, Policy and Charging Rules Function (PCRF) entity, the method includes: a policy and charging rules function entity receiving an indication of gateway control session establishment from a bearer binding and event report function entity, wherein the indication of gateway control session establishment carries a session identifier, and the session identifier is used to identify whether a user equipment accesses the same packet data network again or the bearer binding and event report function entity relocation occurs; the policy and charging rules function entity receiving the indication of gateway control session establishment, acquiring the session identifier, and judging whether the user equipment accesses the same packet data network again or the bearer binding and event report function entity relocation occurs according to the session identifier.

18 Claims, 9 Drawing Sheets

(56) References Cited

U.S. PATENT DOCUMENTS

| | | | |
|---|---|---|---|
| 8,249,551 B2* | 8/2012 | Jones et al. | 455/406 |
| 2007/0019575 A1* | 1/2007 | Shaheen | 370/310 |
| 2007/0066286 A1 | 3/2007 | Hurtta | |
| 2008/0026724 A1* | 1/2008 | Zhang | 455/411 |
| 2008/0046963 A1* | 2/2008 | Grayson et al. | 726/1 |
| 2008/0259876 A1* | 10/2008 | Qiang et al. | 370/332 |
| 2008/0305825 A1* | 12/2008 | Shaheen | 455/552.1 |
| 2009/0043902 A1* | 2/2009 | Faccin | 709/229 |
| 2009/0264097 A1* | 10/2009 | Cai et al. | 455/406 |
| 2009/0300207 A1* | 12/2009 | Giaretta et al. | 709/232 |
| 2010/0154029 A1* | 6/2010 | Fernandez et al. | 726/1 |

OTHER PUBLICATIONS http://www.quintillion.co.jp/3GPP/Specs/23203-811 .pdf; (Mar. 2008).*

International Search Report for International Application No. PCT/CN2009/072109, mailed Sep. 10, 2009.

Written Opinion for International Application No. PCT/CN2009/072109, mailed Sep. 10, 2009.

International Preliminary Report on Patentability for International Application No. PCT/CN2009/072109, issued Dec. 13, 2010.

Extended European Search Report for European Patent Application No. 09761267.5, dated Jul. 5, 2012 (15 pages).

3gpp: "3rd Generation Partnership Project; Technical Specification Group Services and System Aspects; Policy and Charging Control Architecture (Release 8)," pp. 1-87, XP55021317, Jan. 1, 2008.

"3rd Generation Partnership Project; Technical Specification Group Services and System Aspects; Architecture Enhancements for non-3GPP Accesses (Release 8)," 3GPP Standard; 3GPP TS 23.402, 3rd Generation Partnership Project (3GPP). V1.5.1, pp. 1-141, XP050363653, Nov. 1, 2007.

Motorola et al., "Update to 23.402 for Dedicated Resource-Allocation," Database 3GPP Draft; Database Accession No. 23402_CR0181R4_(Rel-8)_S2-084330_23402CR0181_Dedic, XP050211113, May 29, 2008 (28 pages).

Samsung, "IE Additions for PMIP-Based S5/S8 Procedures," Database 3GPP Draft; Database Accession No. S2-074834_IEs_for_PMIP_S5S8_Changes, XP050261596, Nov. 18, 2007 (6 pages).

* cited by examiner

US 8,621,555 B2

1

ACCESS CONTROL METHOD AND SYSTEM FOR PACKET DATA NETWORK, PCRF ENTITY

CROSS-REFERENCE TO RELATED APPLICATIONS

This application is the U.S. national stage filing under 35 U.S.C. §371 of International Application No. PCT/CN2009/072109 filed Jun. 3, 2009, which claims benefit of Chinese Patent Application No. 200810100442.8, filed Jun. 11, 2008.

FIELD OF THE INVENTION

The present invention relates to communication fields, and more particularly to an access control method and system for Packet Data Network (PDN), Policy and Charging Rules Function (PCRF) entity.

BACKGROUND OF THE INVENTION

The Evolved Packet System (EPS) of the 3rd Generation Partnership Project (3GPP) is composed of an Evolved Universal Terrestrial Radio Access Network (E-UTRAN), a Mobility Management Entity (MME), a Serving Gateway (S-GW), a Packet Data Network Gateway (P-GW or PDN GW), a Home Subscriber Server (HSS), an Authentication, Authorization and Accounting (AAA) server of 3GPP, a Policy and Charging Rules Function (PCRF) entity and other supporting nodes.

FIG. 1 is a schematic diagram illustrating the system architecture of the EPS according to the related art. As shown in FIG. 1, the MME is responsible for the related work of control plane, such as the mobility management, the processing of non-access stratum signaling and the management of user mobility managing context; the S-GW is an access gateway device connected with the E-UTRAN, which forwards data between the E-UTRAN and the P-GW, and is responsible for caching the paging waiting data; the P-GW is an edge gateway between the EPS and the Packet Data Network (PDN), and is responsible for functions such as the access of the PDN and the data forwarding between the EPS and the PDN; the PCRF is a policy and charging rules function entity, it is connected with the Internet Protocol (IP) service network of an operator via a receiving interface Rx and acquires the service information, and in addition, it is connected with the gateway device of the network via a Gx/Gxa/Gxc interface, and is responsible for initiating the establishment of IP bearers, for guaranteeing the Quality of Service (QoS) of service data, and for performing the charge control.

The EPS supports the interconnection with a non-3GPP system, wherein the interconnection with the non-3GPP system is implemented via an S2a/b/c interface; the P-GW serves as an anchor point between the 3GPP system and the non-3GPP system. In the system architecture diagram of the EPS, the non-3GPP system is classified into a trusted non-3GPP IP access and an untrusted non-3GPP IP access. The trusted non-3GPP IP access can be connected with the P-GW via an S2a interface directly; while the untrusted non-3GPP IP access needs to be connected with the P-GW via the Evolved Packet Data Gateway (ePDG); the interface between the ePDG and the P-GW is S2b; S2c provides the control and the mobility supporting related to user plane between the User Equipment (UE) and the P-GW, the supported mobility management protocol is Mobile IPv6 Support for Dual Stack Hosts and Routers (DSMIPv6).

2

In the 3GPP network before the EPS, the Policy and Charging Enforcement Function (PCEF) entity resides in the P-GW; the control of all functions may be completed as long as there is an interface between the PCRF and the P-GW; the information is exchanged between the PCRF and the P-GW via a Gx interface (as shown in FIG. 1). When the interface between the P-GW and the S-GW is based on Proxy Mobile IPv6 (PMIPv6), there is further a Bearer Binding and Event Report Function (BBERF) entity in the S-GW for performing the QoS control for service data flows; the information is exchanged between the S-GW and the PCRF via a Gxc interface (as shown in FIG. 1). When accessing via the trusted non-3GPP access, there may also be a BBERF which resides in the trusted non-3GPP access gateway. The information is exchanged between the trusted non-3GPP access gateway and the PCRF via a Gxa interface (as shown in FIG. 1). When a UE roams, an S9 interface serves as the interface of the home PCRF and the visit PCRF, provides the UE with the Application Function (AF) of the service at the same time, and sends the service information which is used for instituting a Policy and Charging Control (PCC) policy to the PCRF via an Rx interface. The EPS system supports Multiple PDN access, i.e. the UE may access multiple PDNs simultaneously via multiple P-GWs or one P-GW, the EPS also supports that a UE may access the same PDN multiple times simultaneously. In the 3GPP, the corresponding PDN network may be found according to the Access Point Name (APN). Therefore, it can be considered that a UE may access the same APN for multiple times simultaneously. A connection from a UE to the PDN network is usually referred to as an IP Connectivity Access Network (IP-CAN) session; therefore, the EPS supports that a UE may have multiple IP-CAN sessions with the same PDN network simultaneously.

FIG. 2 is a flowchart illustrating the initial attachment for a UE accessing the EPS via the trusted non-3GPP access network according to the related art. As shown in FIG. 2, the specific steps for a UE initially attaching to a PDN via the trusted non-3GPP access network are as follows.

Step S201, the UE accesses a trusted non-3GPP access network;

Step S202, after accessing the trusted non-3GPP access network, the UE requests the HSS/AAA to perform the EPS access authentication; after receiving the EPS access authentication request, the HSS/AAA authenticates the UE which sent the request; after finishing the authentication of the UE, the HSS/AAA sends P-GW selecting information subscribed for the UE and the APN subscribed for the UE, which includes the default APN, to the trusted non-3GPP access gateway;

Step S203, after the authentication is successful, the attaching process of layer 3 is triggered;

Step S204, the trusted non-3GPP access gateway in which a BBERF resides sends a gateway control session establishing request message to the PCRF, wherein the gateway control session establishing request message carries the Network Access Identifier (NAI) of the UE and the default APN;

Step S205, the PCRF institutes a PCC rule and QoS rule according to the network policy, the bearer attribute, the subscription data of the user and so on. meanwhile, corresponding event trigger may also be instituted; the PCRF sends the QoS rule and the event trigger to the trusted non-3GPP access gateway via a "gateway control session establishment acknowledge" message; the trusted non-3GPP access gateway installs the QoS rule and the event trigger;

Step S206, after receiving the P-GW selecting information, the trusted non-3GPP access gateway selects the P-GW according to the P-GW selecting information, and sends to the selected P-GW a proxy binding update message carrying the NAI of the UE and the default APN;

Step S207, after receiving the proxy binding update message, the P-GW in which the PCEF resides sends to the PCRF an indication of IP-CAN session establishing carrying the NAI of UE, the IP address which is allocated for the UE by the P-GW and the default APN;

Step S208, after receiving the indication of IP-CAN session establishing, the PCRF associates the indication of IP-CAN session establishing with the forgoing indication of gateway control session establishment according to the NAI of UE and the default APN, meanwhile, searches the subscription information of the UE, and updates the originally instituted rule according to the network policy, the bearer attribute, the subscription information of the user, and so on; the PCRF sends to the P-GW an IP-CAN session establishment acknowledge message carrying the PCC rule;

Step S209, after receiving the IP-CAN session establishment acknowledge message, the P-GW installs and executes the PCC rule carried in the IP-CAN session establishment acknowledge message, and sends its own IP address to the HSS at the same time;

Step S210, the P-GW returns a proxy binding acknowledge message to the trusted non-3GPP access gateway;

Step S211, if the QoS rule instituted in step S208 is different from that sent in step S205, the PCRF delivers the updated QoS rule to the trusted non-3GPP access gateway via a gateway control and QoS policy rule providing message;

Step S212, the trusted non-3GPP access gateway installs the QoS rule, and returns a gateway control and QoS policy rule providing acknowledge message;

Step S213, layer 3 attachment is completed;

Step S214, a PMIPv6 tunnel is established between the trusted non-3GPP access gateway and the P-GW; the UE may send or receive data; and the process is terminated.

When a UE establishes a second PDN connection with the default APN, the UE sends to the trusted non-3GPP access gateway a "new PDN connection establishing trigger message" carrying the default APN; the other steps are as shown in steps S204-S214. Every time a PDN connection is established, the P-GW allocates an IP address for the UE.

In the above process, the interaction between the trusted non-3GPP access gateway and the PCRF is before the interaction between the P-GW and the PCRF; at this time, the trusted non-3GPP gateway does not have the IP address which is allocated for the UE by the P-GW; regardless of the initial attachment or the second access or accessing the same PDN for multiple times, the trusted non-3GPP access gateway has only the NAI and the default APN when the trusted non-3GPP access gateway interacts with the PCRF. Since the NAIs and the default APNs are identical for multiple connections of the UE to the same PDN (or APN), the PCRF can not distinguish these multiple PDN connections according to such information, and thus can not associate the gateway control session message with the IP-CAN session message belonging to the same PDN connection.

However, for a PCRF, the gateway control session message and the IP-CAN session message belonging to the same IP-CAN session must correspond to each other one by one. The PCC rule includes the QoS control policy and the charging policy while the QoS rule only includes the QoS control policy. The charging policy of the PCC rule is associated with the provided QoS, that is to say, the charging policy installed in the PCEF must be associated with the QoS control policy installed in the BBERF. To guarantee the correct charging, the PCRF must guarantee that the BBERF has a successfully-activated QoS rule corresponding to the PCC rule successfully-activated in the PCRF. The corresponding PCC rule and QoS rule are delivered via the corresponding gateway control session message and the IP-CAN session message. Similarly, when a UE accesses the same PDN (or APN) for multiple times, there is also a problem in the existing switching technology. FIG. 3 shows the process that a UE is switched from accessing EPS via a trusted non-3GPP access network 1 to accessing EPS via another trusted non-3GPP access network 2. The wireless access technologies of the two trusted non-3GPP access networks are the same. The detailed steps are as follows.

Step S301, according to the process of FIG. 2, a UE accesses trusted non-3GPP access network 1, and establishes a PDN connection to the default APN via the access network;

Step S302, the UE finds trusted non-3GPP access network 2, and decides to initiate switching;

Step S303, after accessing trusted non-3GPP access network 2, the UE requests the HSS/AAA to perform the EPS access authentication; after receiving the EPS access authentication request, the HSS/AAA authenticates the UE which sent the request; after finishing the authentication of UE, the HSS/AAA sends the IP address of the P-GW selected by the UE via access network 1 and the APN including the default APN subscribed by the UE to trusted non-3GPP access gateway 2;

Step S304, after the authentication is successful, the attaching process of layer 3 is triggered;

Step S305, trusted non-3GPP access gateway 2 in which a BBERF resides sends a gateway control session establishing request message to the PCRF, wherein the gateway control session establishing request message carries the NAI of the UE and the default APN;

Step S306, the PCRF finds the information before the switching of the user according to the NAI of the UE and the default APN, associates the message with the session before the switching, and sends the corresponding QoS rule and event trigger to trusted non-3GPP access gateway 2 via a "gateway control session establishment acknowledge" message. The PCRF may also update the foregoing QoS rule and event trigger. Trusted non-3GPP access gateway 2 installs the QoS rule and the event trigger;

Step S307, trusted non-3GPP access gateway 2 sends to the P-GW a proxy binding update message carrying the NAI of the UE and the default APN;

Step S308, after receiving the proxy binding update message, the P-GW in which the PCEF resides sends to the PCRF an indication of IP-CAN session modification carrying the NAI of the UE, the default APN and the IP address which is allocated for the UE by the P-GW;

Step S309, after receiving the indication of IP-CAN session modification, the PCRF sends it to the P-GW via an IP-CAN session modification acknowledge message according to the PCC rule before the switching of the UE. The PCRF may update the originally instituted PCC and QoS rule. After receiving the IP-CAN session establishment acknowledge message, the P-GW installs and executes the PCC rule;

Step S310, the P-GW returns a proxy binding acknowledge message to the trusted non-3GPP access gateway;

Step S311, if the QoS rule updated in step S309 is different from that sent in step S306, the PCRF delivers the updated QoS rule to the trusted non-3GPP access gateway via a gateway control and QoS policy rule providing message;

Step S312, the trusted non-3GPP access gateway installs the QoS rule, and returns a gateway control and QoS policy rule providing acknowledge message;

Step S313, layer 3 attachment is finished;

Step S314, a PMIPv6 tunnel is established between trusted non-3GPP access gateway 2 and the P-GW; the UE may send or receive data; and the process is terminated.

In the process, when the PCRF receives the indication of gateway control session establishment carrying the NAI and the default APN in step S305, since it is the same as the message received when the UE accesses the APN again, the PCRF can not judge whether the UE is switched (i.e. the BBERF relocation occurs) or the UE requests to establish another PDN connection to the default APN.

The above two problems exist also in the prior art when the UE accesses from the E-UTRAN, and the PMIPv6 protocol is used between the S-GW and the P-GW. (1) the PCRF is unable to determine whether it is BBERF relocation or another PDN connection that the UE requests to establish to an APN when the PCRF receives the indication of gateway control session establishment. (2) it is unable to associate the IP-CAN session message and the gateway control session message related to the same PDN connection.

SUMMARY OF THE INVENTION

The objective of the present invention is to provide an access control method and system for packet data network, and policy and charging rules function entity, so as to solve the problem that the PCRF can not judge whether a UE accesses the same APN for multiple times, and can not identify different IP-CAN sessions when the UE accesses the same APN for multiple times.

According to an aspect of the present invention, an access control method for packet data network is provided.

The access control method for packet data network according to an embodiment of the present invention comprises: a policy and charging rules function entity receiving an indication of gateway control session establishment from a bearer binding and event report function entity, wherein the indication of gateway control session establishment carries a session identifier, and the session identifier is used to identify whether a user equipment accesses the same packet data network again or the bearer binding and event report function entity relocation occurs; the policy and charging rules function entity receiving an indication of control session establishment from a gateway, obtaining the session identifier, and judging whether the user equipment accesses the same packet data network again or the bearer binding and event report function entity relocation occurs according to the session identifier.

Preferably, the session identifier is also used for uniquely identifying an internet protocol connectivity access network session of the user equipment.

Preferably, after the policy and charging rules function entity judging whether the user equipment accesses the same packet data network again or the bearer binding and event report function entity relocation occurs according to the session identifier, the method further comprises: a gateway in which the bearer binding and event report function entity resides sending to a gateway in which a policy and charging enforcement function entity resides a proxy binding update request message carrying the session identifier; the gateway in which the policy and charging enforcement function entity resides receiving the proxy binding update request message, and the policy and charging enforcement function entity sending an indication of internet protocol connectivity access network session establishment to the policy and charging rules function entity, and carrying the session identifier in the indication of internet protocol connectivity access network session establishment; the policy and charging rules function entity associating the indication of gateway control session establishment with the indication of internet protocol connectivity access network session establishment according to the session identifier.

Preferably, before the bearer binding and event report function entity sending the indication of gateway control session establishment, the method further comprises: the bearer binding and event report function entity allocating the session identifier.

Preferably, before the bearer binding and event report function entity sending the indication of gateway control session establishment, the method further comprises: a mobility management entity allocating the session identifier; the mobility management entity sending a default bearer establishment request message to the bearer binding and event report function entity, and carrying the session identifier in the default bearer establishment request message.

Preferably, the information of the session identifier is added to an access point name; and the access point name carrying the information of the session identifier is used as the session identifier.

Preferably, the information of the session identifier is added to a default bearer address; the default bearer address carrying the information of the session identifier is used as the session identifier.

Preferably, after the policy and charging rules function entity judging whether the user equipment accesses the same packet data network again or the bearer binding and event report function entity relocation occurs according to the session identifier, the method further comprises: based on the indication of gateway control session establishment, the policy and charging rules function entity instituting a policy and charging control rule, a quality of service rule and a corresponding event trigger, sending a gateway control session establishment acknowledge message to the bearer binding and event report function entity, and carrying the quality of service rule and the event trigger in the gateway control session establishment acknowledge message; the bearer binding and event report function entity receiving the gateway control session establishment acknowledge message, acquiring the quality of service rule and the event trigger from the gateway control session establishment acknowledge message, and installing the quality of service rule and the event trigger.

Preferably, when the user equipment accesses a packet data network for the first time or reestablishes the first access to the packet data network, the indication of gateway control session establishment does not carry the session identifier.

Preferably, before the policy and charging rules function entity receiving an indication of gateway control session establishment from a bearer binding and event report function entity, the method further comprises: based on a packet data network connection request message of the user equipment, the bearer binding and event report function entity sending the indication of gateway control session establishment to the policy and charging rules function entity.

According to an aspect of the present invention, an access control method for packet data network is also provided.

The access control method for packet data network according to an embodiment of the present invention comprises: a bearer binding and event report function entity sending an indication of gateway control session establishment to a policy and charging rules function entity, wherein the indication of gateway control session establishment carries a session identifier, the session identifier is used to uniquely identify a internet protocol connectivity access network session of a user equipment; a gateway in which the bearer binding and event report function entity resides sending a proxy binding update request message to a gateway in which the policy and charging enforcement function entity resides, and carrying the session identifier in the proxy binding update request message; the gateway in which the policy and charging enforcement function entity resides receiving the proxy binding update request message, and the policy and charging enforcement function entity sending an indication of internet protocol connectivity access network session establishment or an indication of internet protocol connectivity access network session modification to the policy and charging rules function entity, and carrying the session identifier in the indication of internet protocol connectivity access network session establishment or the indication of internet protocol connectivity access network session modification; the policy and charging rules function entity associating the indication of gateway control session establishment with the indication of internet protocol connectivity access network session establishment or the indication of internet protocol connectivity access network session modification according to the session identifier.

According to another aspect of the present invention, an access control system for packet data network is provided.

The access control system for packet data network according to an embodiment of the present invention comprises: a bearer binding and event report function entity, configured to send an indication of gateway control session establishment and to carry a session identifier in the indication of gateway control session establishment, wherein the session identifier is used to identify whether a user equipment accesses a same packet data network again or the bearer binding and event report function entity relocation occurs, and to uniquely identify a internet protocol connectivity access network session of the user equipment; a policy and charging rules function entity, configured to receive the indication of gateway control session establishment from the bearer binding and event report function entity, to acquire the session identifier from the indication of gateway control session establishment, and to judge whether the user equipment accesses the same packet data network again or the bearer binding and event report function entity relocation occurs according to the session identifier.

Preferably, the bearer binding and event report function entity is further configured to allocate the session identifier.

Preferably, the system further comprises: a gateway in which the bearer binding and event report function entity resides, configured to send a proxy binding update request message carrying the session identifier; the bearer binding and event report function entity is further configured to receive a gateway control session establishment acknowledge message, to acquire a quality of service rule and an event trigger from the gateway control session establishment acknowledge message, and to install the quality of service rule and the event trigger; the policy and charging rules function entity is further configured to receive an indication of internet protocol connectivity access network session establishment, to carry the session identifier in the indication of internet protocol connectivity access network session establishment, to associate the indication of gateway control session establishment with the indication of interne protocol connectivity access network session establishment according to the session identifier, to institute a policy and charging control rule, the quality of service rule and the corresponding event trigger based on the indication of gateway control session establishment, to send the gateway control session establishment acknowledge message to the bearer binding and event report function entity, and to carry the quality of service rule and the event trigger in the gateway control session establishment acknowledge message.

Preferably, the above access control system for packet data network further comprises: a gateway in which a policy and charging enforcement function entity resides, configured to receive the proxy binding update request message from the gateway in which the bearer binding and event report function entity resides; the policy and charging enforcement function entity, configured to send the indication of internet protocol connectivity access network session establishment to the policy and charging rules function entity, and to carry the session identifier in the indication of internet protocol connectivity access network session establishment.

Preferably, a mobility management entity, configured to allocate the session identifier, to send a default bearer establishment request message to the bearer binding and event report function entity, and to carry the session identifier in the default bearer establishment request message.

According to another aspect of the present invention, an access control system for packet data network is also provided.

The access control system for packet data network according to an embodiment of the present invention comprises: a bearer binding and event report function entity, configured to send an indication of gateway control session establishment to a policy and charging rules function entity, and to carry a session identifier in the indication of gateway control session establishment, wherein the session identifier is used to uniquely identify a internet protocol connectivity access network session of a user equipment; a gateway in which the bearer binding and event report function entity resides is further configured to send a proxy binding update request message to a gateway in which the policy and charging enforcement function entity resides, and to carry the session identifier in the proxy binding update request message; the gateway in which the policy and charging enforcement function entity resides, configured to receive the proxy binding update request message; the policy and charging enforcement function entity, configured to send an indication of internet protocol connectivity access network session establishment or an indication of internet protocol connectivity access network session modification to the policy and charging rules function entity, and to carry the session identifier in the indication of internet protocol connectivity access network session establishment or the indication of internet protocol connectivity access network session modification; the policy and charging rules function entity, configured to receive the indication of gateway control session establishment from the bearer binding and event report function entity and the indication of internet protocol connectivity access network session establishment or the indication of internet protocol connectivity access network session modification from the policy and charging enforcement function entity, and to associate the indication of gateway control session establishment with the indication of internet protocol connectivity access network session establishment or the indication of internet protocol connectivity access network session modification according to the session identifier.

According to still another aspect of the present invention, a policy and charging rules function entity is provided.

The policy and charging rules function entity according to an embodiment of the present invention comprises: a receiving module, configured to receive an indication of gateway control session establishment from a bearer binding and event report function entity, wherein the indication of gateway control session establishment carries a session identifier which is used to identify whether a user equipment accesses a same packet data network again or the bearer binding and event report function entity relocation occurs; an acquiring module, configured to acquire the session identifier from the indication of gateway control session establishment; a judging module, configured to judge whether the user equipment accesses the same packet data network again or the bearer binding and event report function entity relocation occurs according to the session identifier.

According to still another aspect of the present invention, a policy and charging rules function entity is also provided.

The policy and charging rules function entity according to an embodiment of the present invention comprises: a receiving module, configured to receive an indication of gateway control session establishment from a bearer binding and event report function entity and an indication of internet protocol connectivity access network session establishment or an indication of internet protocol connectivity access network session modification from a policy and charging enforcement function entity, wherein the indication of gateway control session establishment, the indication of internet protocol connectivity access network session establishment and the indication of internet protocol connectivity access network session modification carry a session identifier, the session identifier is used to uniquely identify a internet protocol connectivity access network session of a user equipment; an acquiring module, configured to acquire the session identifier from the indication of gateway control session establishment and the indication of internet protocol connectivity access network session establishment or the indication of internet protocol connectivity access network session modification; an associating module, configured to associate the indication of gateway control session establishment with the indication of internet protocol connectivity access network session establishment or the indication of internet protocol connectivity access network session modification according to session identifier.

In the above embodiments, a method for distinguishing whether a user equipment accesses the same packet data network again or the bearer binding and event report function entity relocation occurs and for identifying different IP-CAN sessions is provided by carrying a session identifier in the indication of gateway control session establishment; the above method is applied to an evolved packet system of 3GPP, so that the PCRF can determine that a UE accesses the same APN for multiple times and can uniquely identify different IP-CAN sessions when the UE accesses the same APN for multiple times.

BRIEF DESCRIPTION OF THE DRAWINGS

The accompanying drawings are used for further illustrating the present invention and constitute a part of the specification, they are used to explain the present invention together with the embodiments of the present invention and are not for use in limiting the present invention. Wherein.

DETAILED DESCRIPTION OF EMBODIMENTS

A detailed description is given to the preferred embodiments of the invention with reference to the accompanying drawings. The preferred embodiment of the present invention is described for the purpose of illustration, not for limiting the present invention.

Method Embodiment

According to an embodiment of the present invention, an access control method for packet data network is provided.

Figure 1:
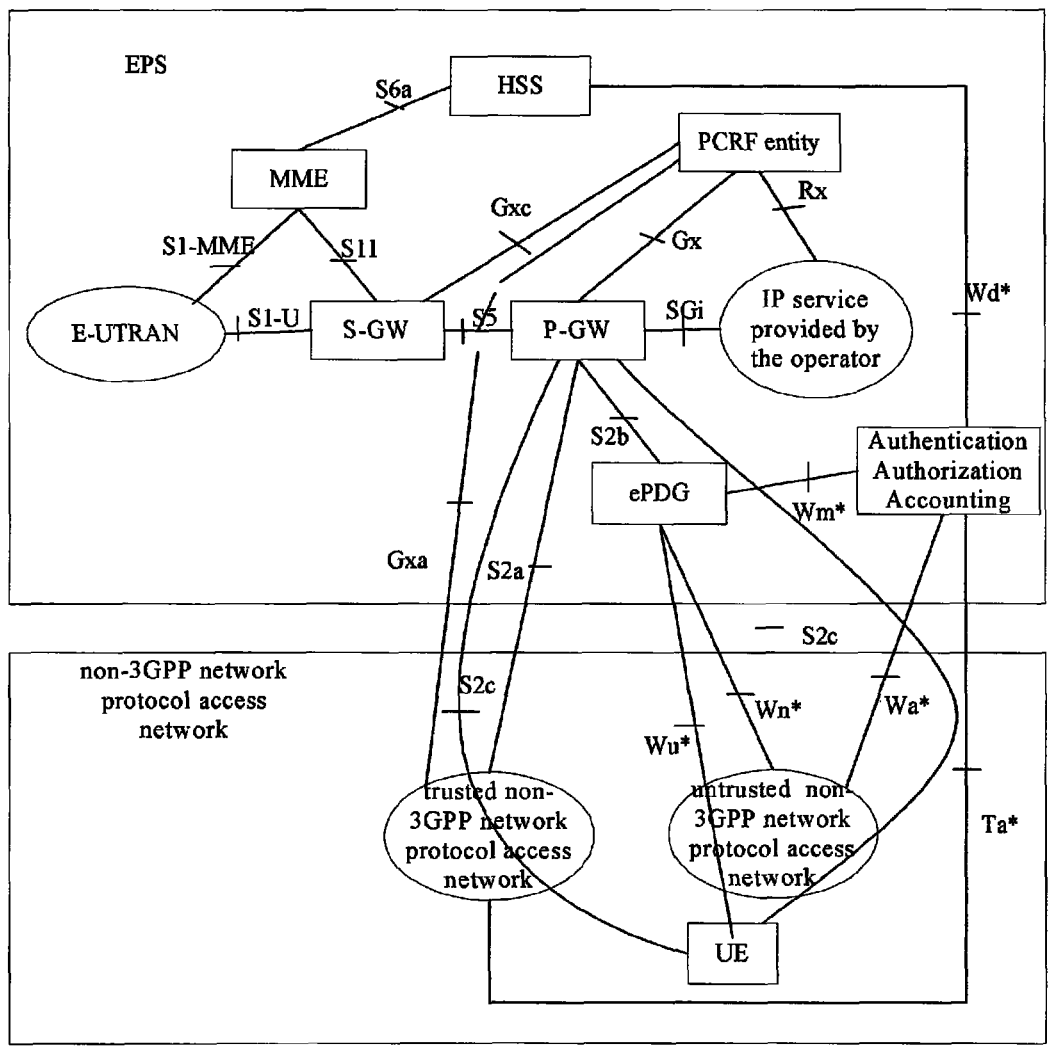
FIG. 1 is a schematic diagram illustrating the system architecture of the EPS according to the related art.
Figure 2:
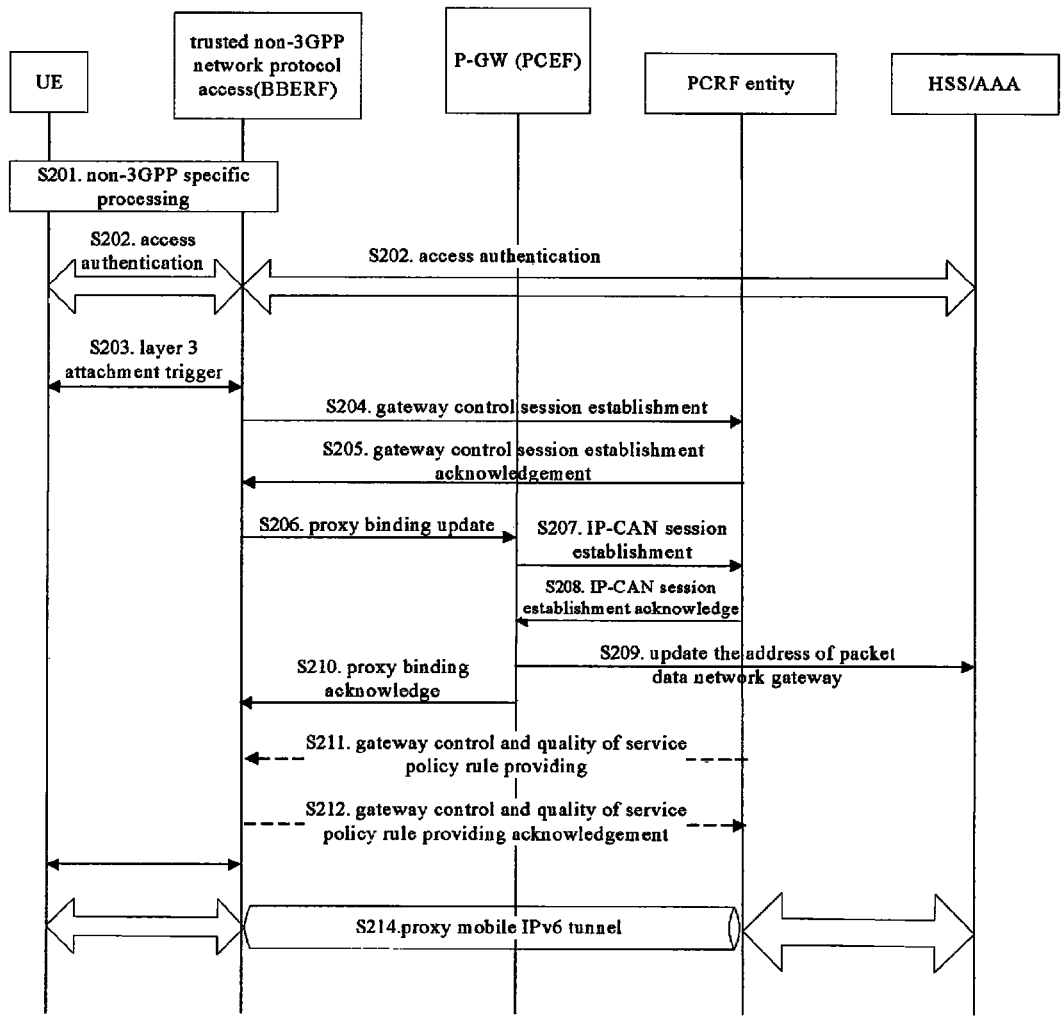
FIG. 2 is a flowchart illustrating the process for a UE accessing the initial attachment of EPS via the trusted non-3GPP access network according to the related art.
Figure 3:
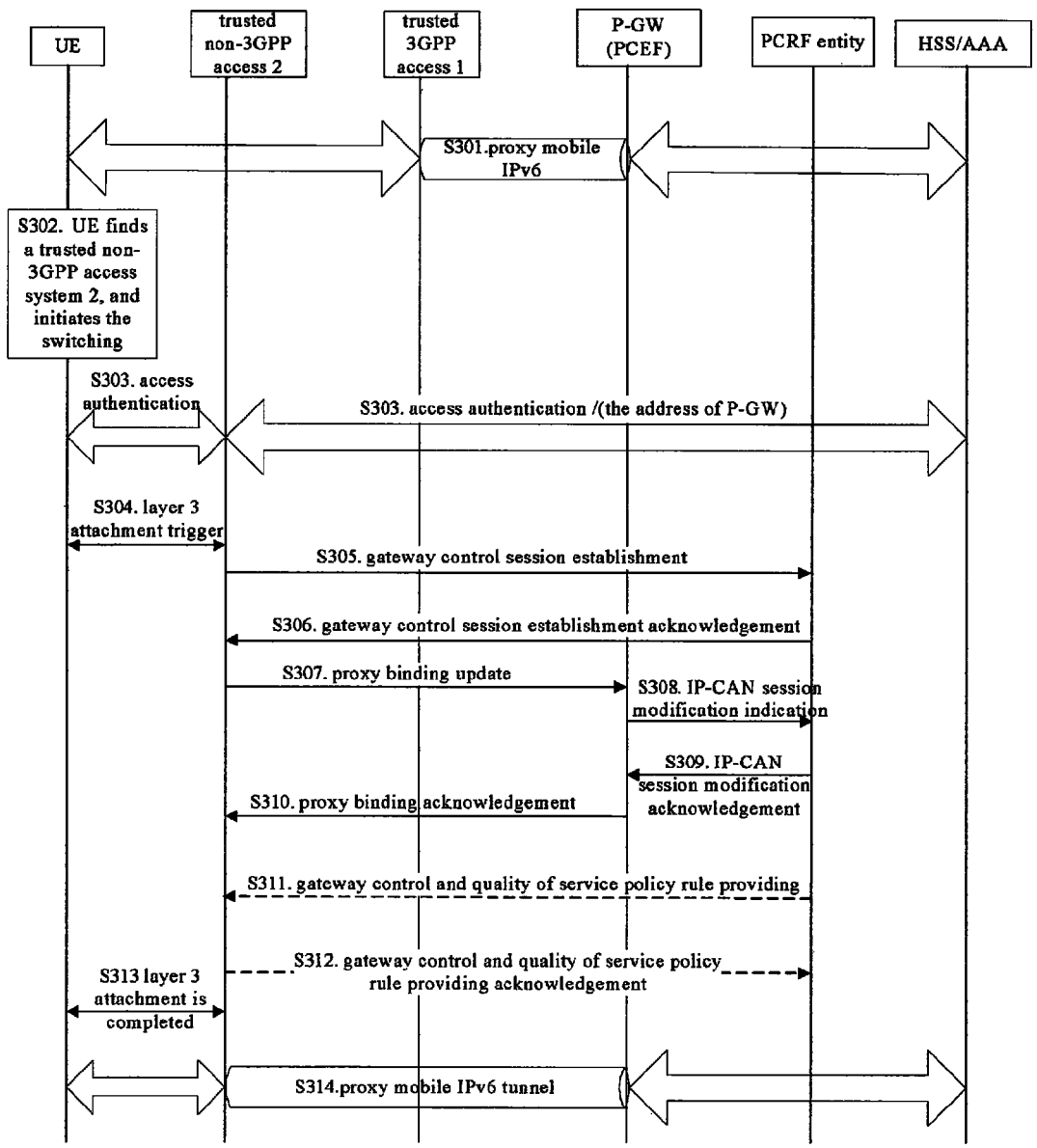
FIG. 3 is a flowchart illustrating the process that a UE is switched from one trusted non-3GPP access network to another trusted non-3GPP access network according to the related art.
Figure 4:
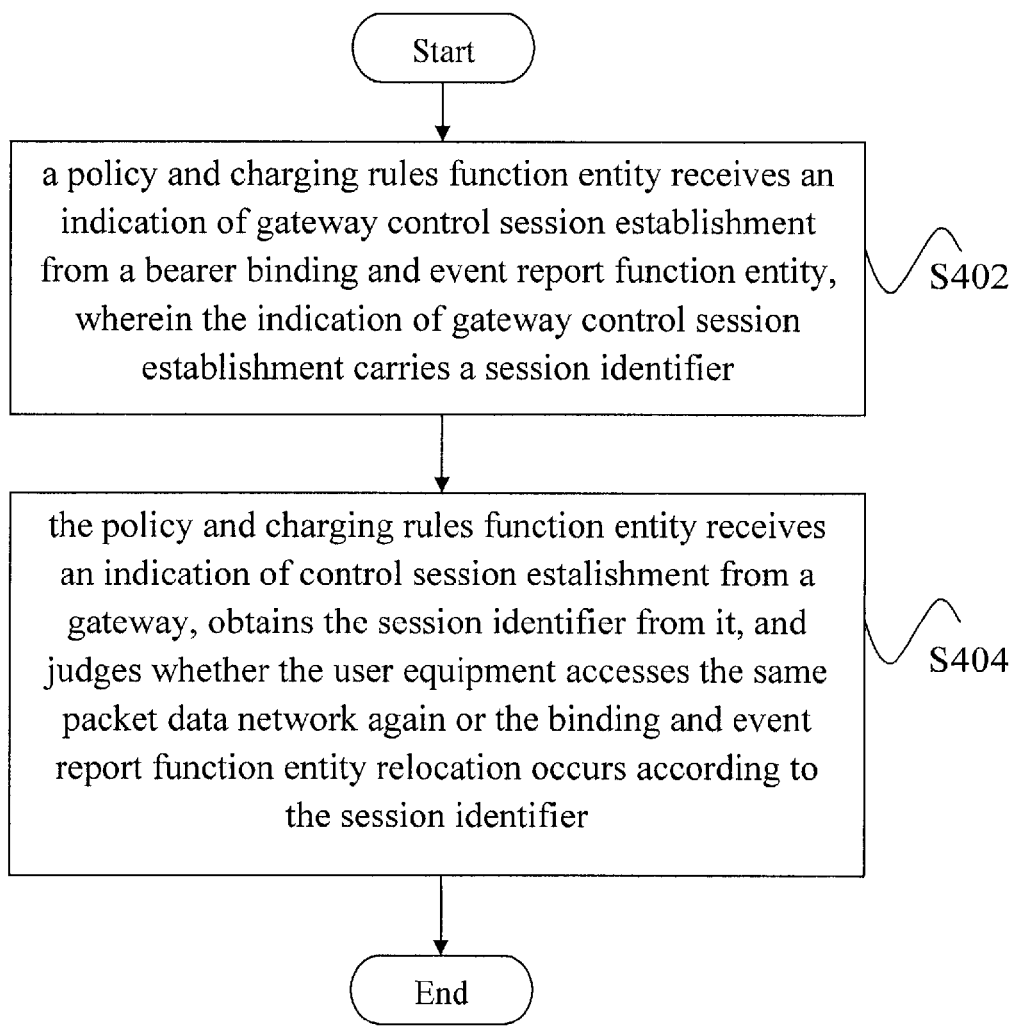
FIG. 4 is a flowchart illustrating the access control method for packet data network according to an embodiment of the present invention.

FIG. 4 is a flowchart illustrating the access control method for PDN according to an embodiment of the present invention; As shown in FIG. 4, the access control method includes:

Step S402, a PCRF entity receives an indication of gateway control session establishment from a BBERF entity, wherein the indication of gateway control session establishment carries a session identifier, and the session identifier is used to identify whether a user equipment accesses the same packet data network again or the BBERF entity relocation occurs; the session identifier is also used to uniquely identify a internet protocol connectivity access network session of the user equipment; it should be noted that, when the UE accesses the PDN for the first time or reestablishes the first access to the PDN, the indication of gateway control session establishment does not carry the session identifier; in this way, it is possible to distinguish the reaccess of the terminal and the BBERF relocation;

Step S404, the PCRF entity receives the indication of control session establishment from a gateway, obtains the session identifier from the indication of control session establishment, and judges whether the UE accesses the same packet data network again or the BBERF entity relocation occurs according to the session identifier.

After step S404, the above method further includes:

(41) based on the indication of gateway control session establishment, the PCRF entity institutes a policy and charging control rule, a quality of service rule and a corresponding event trigger, sends a gateway control session establishment acknowledge message to the BBERF entity, and carries the quality of service rule and the event trigger in the gateway control session establishment acknowledge message;

(42) the BBERF entity receives the gateway control session establishment acknowledge message, acquires the quality of service rule and the event trigger from it, and installs the quality of service rule and the event trigger;

(43) the gateway in which the BBERF entity resides sends a proxy binding update request message to the gateway in which the PCEF entity resides, and carries the session identifier in the proxy binding update request message;

(44) the gateway in which the PCEF entity resides receives the proxy binding update request message, the PCEF entity sends an indication of internet protocol connectivity access network session establishment to the PCRF entity, and carries the session identifier in the indication of internet protocol connectivity access network session establishment;

(45) the PCRF entity associates the indication of gateway control session establishment with the indication of internet protocol connectivity access network session establishment according to the session identifier.

Before step S402, the above method further includes one of the following two cases:

(1) the BBERF entity allocates the session identifier; wherein the above session identifier may also be represented by the following mode: the information of the session identifier is added to the access point name and the access point name carrying the information of the session identifier is used as the session identifier.

(2) a mobility management entity allocates the session identifier; the mobility management entity sends a default bearer establishment request message to the BBERF entity, and carries the session identifier in the default bearer establishment request message; wherein the above session identifier may also be represented by the following two modes: the information of the session identifier is added to an access point name and the access point name carrying the information of the session identifier is used as the session identifier; the information of the session identifier is added to a default bearer address (i.e. default bearer ID) and the default bearer address carrying the information of the session identifier is used as the session identifier.

Afterwards, based on a packet data network connection request message of the user equipment, the bearer binding and event report function entity sends an indication of gateway control session establishment to the policy and charging rules function entity.

In addition, the indication of gateway control session establishment does not carry any session identifier when a UE accesses a PDN for the first time or reestablishes the first access to the PDN.

By means of the above embodiments, when a UE accesses the same APN for multiple times, the PCRF is able to judge that a UE accesses the same APN for multiple times, and is able to uniquely identify different IP-CAN sessions.

Embodiment 1

In this embodiment, a process is described that a UE which has accessed a PDN1 via the P-GW accesses PDN1 again by triggering a new PDN connection when the UE resides in the coverage of the trusted non-3GPP access network and accesses the EPS system by use of the PMIPv6.

Figure 5:
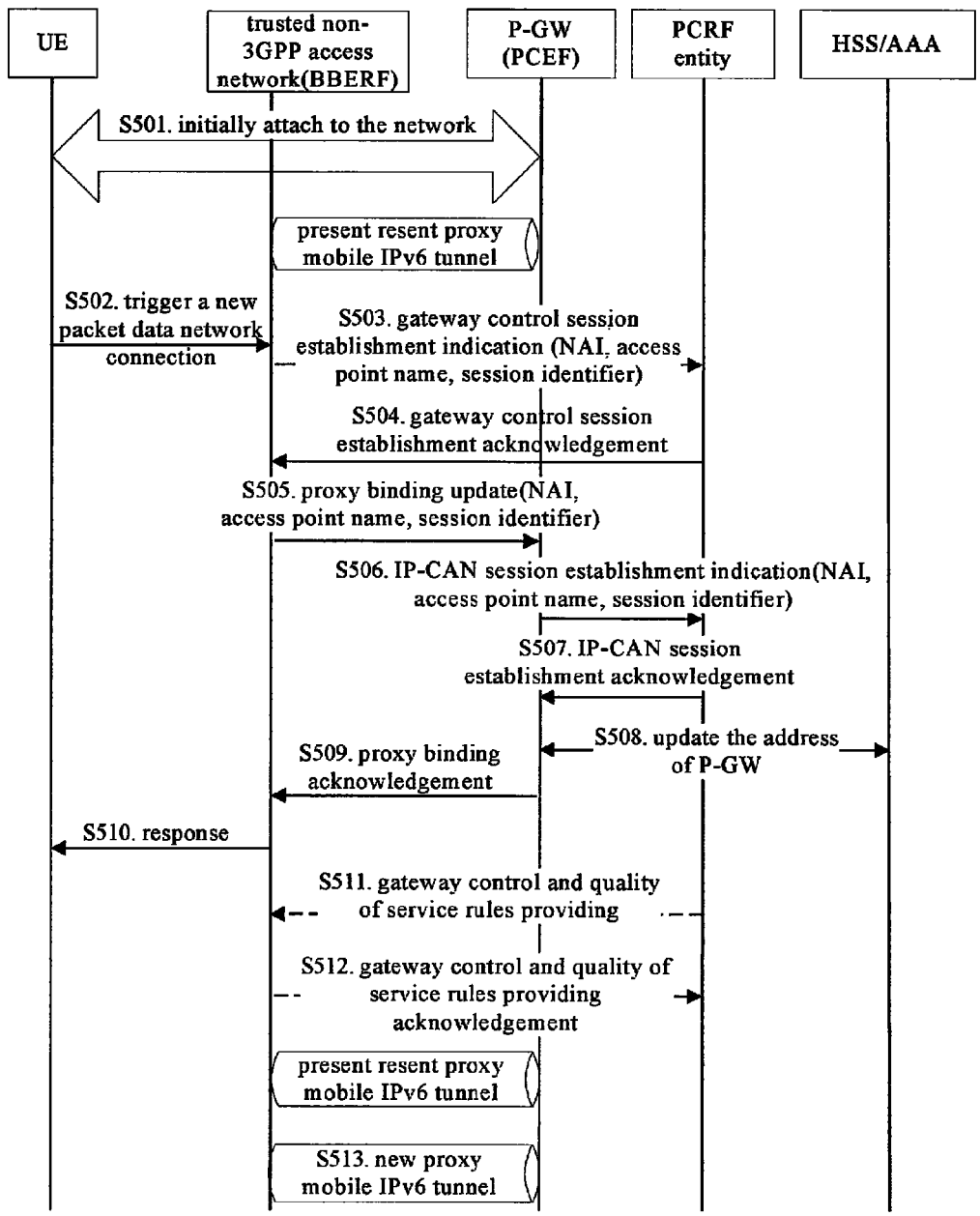
FIG. 5 is a flowchart illustrating the access control method for packet data network according to embodiment 1 of the present invention.

FIG. 5 is a flowchart illustrating the access control method for packet data network according to embodiment 1 of the present invention. As shown in FIG. 5, the steps of the embodiment are as follows:

Step S501, the UE performs initial attachment to a trusted non-3GPP access gateway, and acquires the IP connection with a default PDN1 via the P-GW; the access point name corresponding to PDN1 is APN1;

Step S502, the UE decides to establish a new PDN connection with PDN1, and sends to the trusted non-3GPP access gateway a trigger indication carrying the APN1;

Step S503, based on the above trigger indication, the trusted non-3GPP access gateway, in which the BBERF resides, sends to the PCRF an "indication of gateway control session establishment" message carrying the NAI of the UE, the APN1 and the session identifier;

Wherein the session identifier may be allocated by the trusted non-3GPP access gateway; to guarantee a unique identification of an IP-CAN session, the identifier is unique at least for the same UE and the same APN.

During implementation, the trusted non-3GPP access gateway may modify the APN1 by adding the information of the session identifier to the APN1 to form a modified APN1. For example, APN1 is internet.operator.com, and the session identifier is 2, then the modified APN1 is internet.operator.com:2. That is to say, the session identifier is included in the modified APN1.

Step S504, the PCRF determines the UE establishes a connection to PDN1 again according to the session identifier; therefore, the PCRF institutes a PCC rule and a QoS rule according to network policy, bearer attribute, and the subscription data of the user, meanwhile, may institutes a corresponding event trigger; the PCRF sends the QoS rule and the event trigger to the BBERF via a "gateway control session establishment acknowledge" message; the BBERF installs the QoS rule and the event trigger;

If what is carried in the message of step S503 is the modified APN1, the PCRF is able to analyze that the UE establishes a connection and the session identifier information to PDN1 again according to the modified APN1.

Step S505, the trusted non-3GPP access gateway sends to the P-GW a "proxy binding update" request message, wherein the "proxy binding update" request message carries the NAI, the APN1 and the session identifier; step S505 may be performed after receiving the message of step S502 instead of waiting for the response of step S504;

Similarly, the "proxy binding update" message may also carry the NAI and the modified APN1, and the session identifier information is included in the modified APN1;

Step S506, the P-GW, in which the PCEF resides, sends to the PCRF an "indication of IP-CAN session establishment" message carrying the NAI, the APN1, the session identifier and the IP address which is allocated for the UE by the P-GW. The PCRF associates the indication of IP-CAN session establishment with the "indication of gateway control session establishment" message of step S503 via the NAI, the APN1 and the session identifier, so that the information established in the PCRF by the two messages are associated with the same IP-CAN session;

Similarly, the indication of IP-CAN session establishment may also carry the NAI and the modified APN1, and the session identifier information is included in the modified APN1;

Step S507, the PCRF returns to the P-GW an "IP-CAN session establishment acknowledge" message carrying corresponding PCC rule and event trigger; the P-GW installs the PCC rule and the event trigger;

If what is carried in step S506 is the modified APN1, the PCRF may analyze the session identifier information;

Step S508, the P-GW stores its own IP address to the HSS;

Step S509, the P-GW returns to the trusted non-3GPP access gateway a "proxy binding acknowledge" message carrying the IP address which is allocated for the UE by the P-GW;

Step S510, the trusted non-3GPP access gateway returns to the UE a response message carrying the IP address of UE;

Step S511, if the information carried in the indication of IP-CAN session establishment in step S506 causes changes of the QoS rule, the PCRF will send the new QoS rule to the trusted non-3GPP access gateway via a gateway control and QoS rule providing message; if the event trigger is also changed and a new event trigger is provided, the message and that in step S507 may be sent simultaneously;

Step S512, the trusted non-3GPP access gateway returns a gateway control and QoS rule providing acknowledge message;

Step S513, a new PMIPv6 tunnel apart from the initially-established PMIPv6 tunnel is established between the trusted non-3GPP access gateway and the P-GW.

It should be noted that, when a UE accesses a PDN network for the first time, the trusted non-3GPP access gateway does not necessarily need to allocate a session identifier; the trusted non-3GPP access gateway needs to allocate the session identifier only when a UE accesses the same PDN for the second time or more, so that the PCRF determines the newly-established connection to the same PDN and associates the message sent by the trusted non-3GPP access gateway with the message sent by the PCEF.

Embodiment 2

In this embodiment, a process is described that a UE which has accessed a PDN1 via the P-GW accesses PDN1 again by triggering a new PDN connection when the UE resides in the coverage of the 3GPP and accesses through the E-UTRAN while the PMIPv6 protocol is used between the S-GW and the P-GW.

Figure 6:
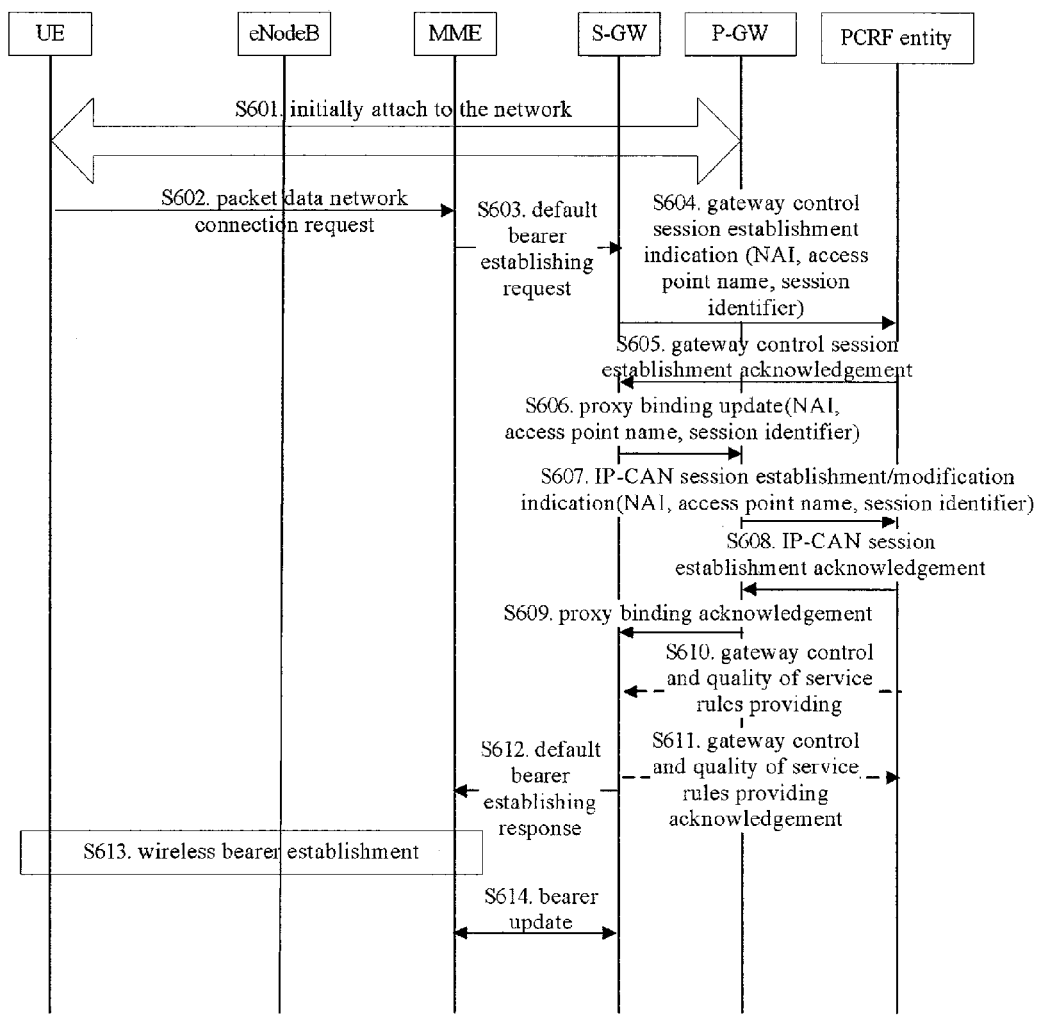
FIG. 6 is a flowchart illustrating the access control method for packet data network according to embodiment 2 of the present invention.

FIG. 6 is a flowchart illustrating the access control method for packet data network according to embodiment 2 of the present invention. As shown in FIG. 6, the steps of the access control method are as follows:

Step S601, the UE performs initial attachment to the E-UTRAN, and acquires the IP connection with a default PDN1 via the P-GW; the access point name corresponding to PDN1 is APN1;

Step S602, the UE decides to establish a new PDN connection with PDN1, and sends a PDN connection request message carrying the APN1;

Step S603, based on the above PDN connection request message, an MME allocates a session identifier for the connection, and sends to the S-GW a default bearer establishment request message carrying the APN1, the default bearer ID and the session identifier information;

During implementation, the MME may modify the APN1 by adding the information of the session identifier to the APN1 to form a modified APN1.

Step S604, the S-GW, in which the BBERF resides, carries the NAI of the UE, the APN1 and the session identifier in an "indication of gateway control session establishment" message;

If what is sent by the MME in step S603 is the modified APN1, the S-GW carries the NAI and the modified APN1 in the "indication of gateway control session establishment" message;

Step S605, the PCRF determines the UE establishes a connection to PDN1 again according to the session identifier; therefore, the PCRF institutes a PCC rule and a QoS rule according to network policy, bearer attribute, and the subscription data of the user, meanwhile, it may institute a corresponding event trigger; the PCRF sends the QoS rule and the event trigger to the S-GW via a "gateway control session establishment acknowledge" message; the S-GW installs the QoS rule and the event trigger;

If what is sent by the S-GW in step S604 is the modified APN1, the PCRF may analyze that the UE establishes a connection and the session identifier information to PDN1 according to the modified APN1.

Step S606, the S-GW sends to the P-GW a "proxy binding update" request message, wherein the "proxy binding update" request message carries the NAI, the APN1 and the session identifier; step S606 may be performed after receiving the message of step S603 instead of waiting for the response of step S605;

If the modified APN1 is used in step S603, the "proxy binding update" request message carries the NAI and the modified APN1;

Step S607, the P-GW, in which the PCEF resides, sends to the PCRF an "indication of IP-CAN session establishment" message carrying the NAI, the APN1, the session identifier and the IP address which is allocated for the UE by the P-GW; the PCRF associates the "indication of IP-CAN session establishment" message with the "indication of gateway control session establishment" message of step S605 according to the NAI, the APN1 and the session identifier, so that the information established in the PCRF by two messages are associated with the same IP-CAN session;

Step S608, the PCRF returns to the P-GW an "IP-CAN session establishment acknowledge" message carrying the corresponding PCC rule and event trigger; the PCEF installs the PCC rule and the event trigger;

Step S609, the P-GW returns to the S-GW a "proxy binding acknowledge" message carrying the IP address which is allocated for the UE by the P-GW;

Step S610, if the information carried in the indication of IP-CAN session establishment in step S607 causes changes of the QoS rule, the PCRF will send the new QoS rule to the trusted non-3GPP access gateway via a gateway control and QoS rule providing message; if the event trigger is also changed, a new event trigger is provided, the message and that in step S608 may be sent simultaneously;

Step S611, the S-GW returns a gateway control and QoS rule providing acknowledge message to the PCRF;

Step S612, the S-GW returns to the MME a default bearer establishment acknowledge message carrying the IP address of the UE;

Step S613, interactions are performed between the MME, the eNodeB and the UE, and a wireless bearer is established;

Step S614, after the wireless bearer is established, the MME sends to the S-GW a bearer update request to notify the address information of eNodeB and so on; and the S-GW returns a response message.

In addition, the embodiment may also be implemented via the following process:

In step S603, the MME sends to the S-GW a default bearer establishment request message carrying the APN1 and the default bearer ID which is different from the default bearer ID allocated by the MME during the initial attachment;

In step S604, the S-GW, in which the BBERF resides, determines that another connection is established between the UE and PDN1 according the default bearer ID, and carries the NAI of the UE, the APN1 and the default bearer ID, i.e. the session identifier uses the default bearer ID, in the "indication of gateway control session establishment" message; in the subsequent steps, the default bearer ID may always be used as the session identifier;

In step S604, the S-GW, in which the BBERF resides, determines that another connection is established between the UE and PDN1 according to the default bearer ID; it may also allocate a session identifier for this connection, and carry the session identifier in the "indication of gateway control session establishment" message and message.

It should be noted that, when a UE accesses a PDN network for the first time, the MME or the S-GW do not need to allocate a session identifier; the MME or the S-GW needs to allocate a session identifier only when a UE accesses the same PDN for the second time or more, so that the PCRF determines the newly-established connection to the same PDN and associates the message sent by the S-GW with the message sent by the PCEF.

Embodiment 3

Figure 7:
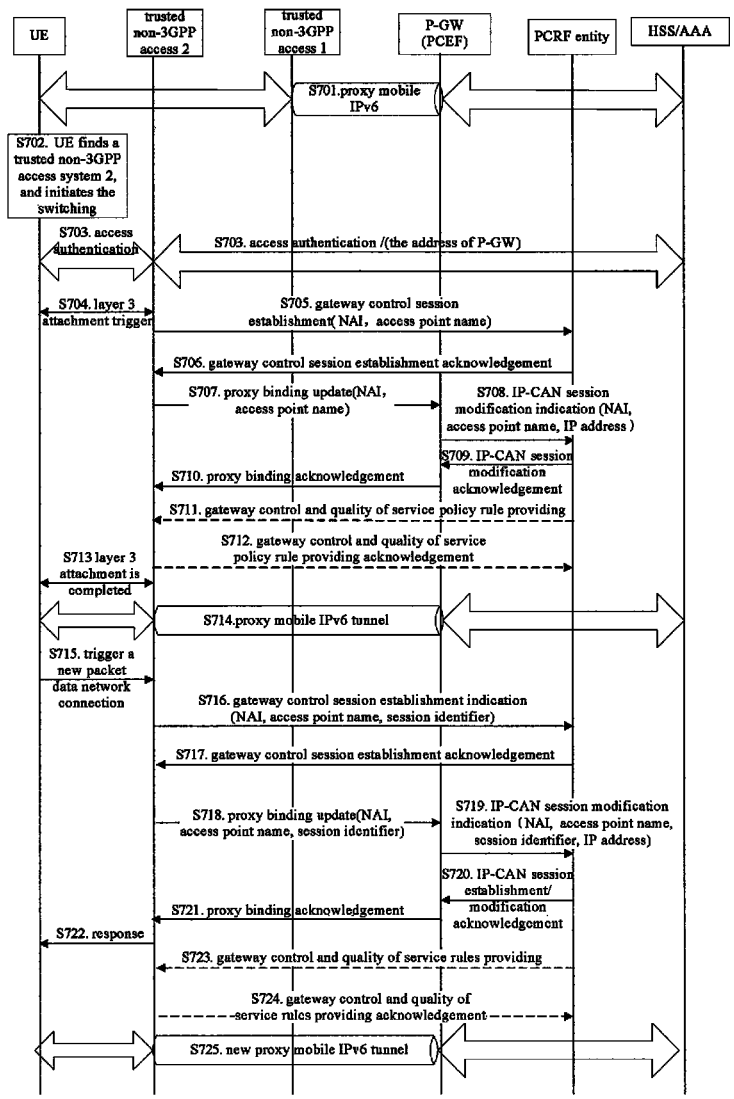
FIG. 7 is a flowchart illustrating the access control method for packet data network according to embodiment 3 of the present invention.

After UE establishes two PDN connections to the APN1 according to the process of embodiment 1, the process that a UE is switched from accessing the EPS via a trusted non-3GPP access network 1 to accessing the EPS via another trusted non-3GPP access network 2 is as shown in FIG. 7; wherein the wireless access technologies of the two trusted non-3GPP access network are the same, the detailed steps are as follows:

Step S701, according to the process as shown in FIG. 5, the UE accesses trusted non-3GPP access network 1, and establishes two PDN connections to a default APN 1 via this access network;

Step S702, the UE finds trusted non-3GPP access network 2, and decides to initiate switching;

Step S703, after accessing trusted non-3GPP access network 2, the UE requests the HSS/AAA to perform the EPS access authentication; after receiving the EPS access authentication request, the HSS/AAA authenticates the UE which sent the request; after finishing the authentication of the UE, the HSS/AAA sends, to trusted non-3GPP access gateway 2, the IP address of P-GW selected by the UE via access network 1 and the APN subscribed for the UE which includes the default APN1;

Step S704, after the authentication is successful, the attaching process of layer 3 is triggered;

Step S705, trusted non-3GPP access gateway 2 in which the BBERF resides sends to the PCRF a gateway control session establishing request message carrying the NAI of the UE and the default APN1;

Step S706, the PCRF finds the information before the switching of the user according to the NAI of the UE and the default APN1, associates the message with the session before the switching, and sends the QoS rule and the event trigger corresponding to the first PDN connection to the APN1 established before the switching to trusted non-3GPP access gateway 2 via a "gateway control session establishment acknowledge" message. The PCRF may also update the foregoing QoS rule and event trigger. Trusted non-3GPP access gateway 2 installs the QoS rule and the event trigger;

Step S707, trusted non-3GPP access gateway 2 sends to the P-GW a proxy binding update message, wherein the proxy binding update message carries the NAI of the UE and the default APN1; step S707 may be performed after receiving the message of step S704 instead of waiting for the response of step S706;

Step S708, after receiving the proxy binding update message, the P-GW, in which the PCEF resides, sends to the PCRF an indication of IP-CAN session modification carrying the NAI of the UE, the default APN1, and the IP address which is allocated, by the P-GW, for the first PDN connection established before the switching of the UE;

Step S709, after receiving the indication of IP-CAN session modification, the PCRF sends the PCC rule of the first PDN connection established before the switching of the UE to the P-GW via an IP-CAN session modification acknowledge message. The PCRF may update the originally instituted PCC, the QoS rule and the event trigger; after receiving the IP-CAN session modification acknowledge message, the P-GW installs and executes the PCC rule and the event trigger;

Step S710, the P-GW returns a proxy binding acknowledge message to trusted non-3GPP access gateway 2;

Step S711, if the QoS rule updated in step S709 is different from that delivered in step S706, the PCRF delivers the updated QoS rule and event trigger to the trusted non-3GPP access gateway via a gateway control and QoS policy rule providing message;

Step S712, the trusted non-3GPP access gateway installs the QoS rule, and returns a gateway control and QoS policy rule providing acknowledge;

Step S713, layer 3 attachment is completed;

Step S714, a PMIPv6 tunnel is established between trusted non-3GPP access gateway 2 and the P-GW; the UE reestablishes a PDN connection to the default APN1;

Step S715, the UE sends to trusted non-3GPP access gateway 2 a trigger indication carrying the APN1 and the switching indication, wherein the switching indication is used for indicating to reestablish a PDN connection before the switching to the trusted non-3GPP access gateway;

Step S716, trusted non-3GPP access gateway 2, in which the BBERF resides, determines that it is needed to reestablish a PDN connection to the APN1 according to the switching indication, thus carries the NAI of the UE, the APN1 and the session identifier in the "indication of gateway control session establishment" message sent to the PCRF;

Wherein the session identifier may be the same as that of trusted non-3GPP access gateway 1, and this session identifier may be acquired by the interaction between trusted non-3GPP access gateway 1 and trusted non-3GPP access gateway 2; the session identifier may also be different from that of trusted non-3GPP access gateway 1, and be only allocated by trusted non-3GPP access gateway 2, this identifier is used for indicating to reestablish a PDN connection or uniquely identifying an IP-CAN session, if it is necessary for uniquely identifying an IP-CAN session, the identifier is at least unique for the same UE and the same APN.

During implementation, trusted non-3GPP access gateway 2 may modify the APN1 by adding the information of the session identifier to the APN1 to form a modified APN1. For example, APN1 is internet.operator.com, the session identifier is 2, then the modified APN1 is internet.operator.com:2, that is to say, the session identifier is included in the modified APN1.

Step S717, the PCRF finds the information before the switching of the user according to the NAI of the UE and the default APN1. If the session identifier of step S716 is acquired by the interaction between the access gateways, the PCRF sends, according to the session identifier, the QoS rule and the event trigger corresponding to the second PDN connection established to the APN1 before the switching to trusted non-3GPP access gateway 2 via a "gateway control session establishment acknowledge" message. Trusted non-3GPP access gateway 2 installs the QoS rule and the event trigger. Otherwise, the PCRF does not perform any operations;

If what is carried in the message of step S716 is the modified APN1, the PCRF analyzes that the UE reestablishes a connection and the session identifier information to PDN1 again according to the modified APN1.

Step S718, trusted non-3GPP access gateway 2 sends to the P-GW a "proxy binding update" request message, wherein the "proxy binding update" request message carries the NAI, the APN1 and the session identifier; step S718 may be performed after receiving the message of step S715 instead of waiting for the response of step S717;

Similarly, the "proxy binding update" message may also carry the NAI and the modified APN1 and the session identifier information is included in the modified APN1;

Step S719, the P-GW, in which the PCEF resides, sends to the PCRF an "indication of IP-CAN session modification" message carrying the NAI, the APN1, the session identifier and the IP address which is allocated by the P-GW for the second PDN connection established before the switching of the UE;

Similarly, the indication of IP-CAN session establishment may also carry the NM and the modified APN1 and the session identifier information is included in the modified APN1;

Step S720, after receiving the indication of IP-CAN session modification, the PCRF associates the indication of IP-CAN session modification with the indication of gateway control session establishment of step S716 according to the session identifier, so as to send the PCC rule and the event trigger corresponding to the second PDN connection established before the switching of the UE to the P-GW via an IP-CAN session modification acknowledge message. The PCRF may update the forgoing instituted PCC, QoS rule and event trigger; after receiving the IP-CAN session modification acknowledge message, the P-GW installs and executes the PCC rule and the event trigger;

If what is carried in step S719 is the modified APN1, the PCRF is able to analyze the session identifier information;

Step S721, the P-GW returns to trusted non-3GPP access gateway 2 a "proxy binding acknowledge" message carrying the IP address which is allocated by the P-GW for the second PDN connection established before the switching of the UE;

Step S722, trusted non-3GPP access gateway 2 returns to the UE a response message carrying the IP address of the UE;

Step S723, if the information carried in the indication of IP-CAN session establishment in step S719 causes changes of the QoS rule, the PCRF will send the new QoS rule to the trusted non-3GPP access gateway via a gateway control and QoS rule providing message; if the event trigger is also changed, a new event trigger is provided, the message and that in step S720 may be sent simultaneously;

Step S724, trusted non-3GPP access gateway 2 returns a gateway control and QoS rule providing acknowledge message;

Step S725, a new PMIPv6 tunnel, apart from the PMIPv6 tunnel established while switching, is established between trusted non-3GPP access gateway 2 and the P-GW; at present, two PDN connections are established between the UE and the APN1.

The UE accesses the EPS via an E-UTRAN according to embodiment 2, and has established two PDN connections to the APN1; when a tracking area update crossing S-GWs or a switching crossing S-GWs happened to the UE causes a BBERF relocation, similarly, the UE first reestablishes the connection of the first PDN established before the switching, a session identifier is not carried either during the interaction between the BBERF or the PCRF and during the interaction between the PCEF and the PCRF; the PCRF respectively delivers, to the BBERF and the PCEF, the rule and the event trigger corresponding to the first PDN connection established before the switching; when the UE triggers to reestablish the second PDN connection, a session identifier is carried during the interaction between the BBERF and the PCEF and during the interaction between the PCEF and the PCRF; the PCRF delivers, to the BBERF and the PCEF, the rule and the event trigger corresponding to the second PDN connection established before the switching.

System Embodiment

Embodiment 1

According to an embodiment of the present invention, an access control system for packet data network is provided.

Figure 8:
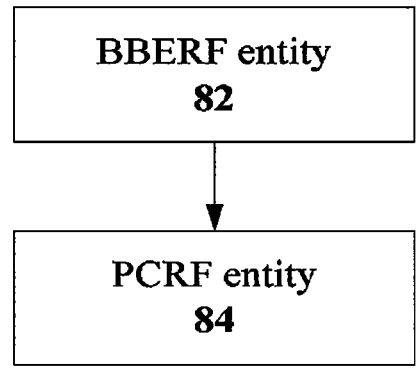
FIG. 8 is a block diagram illustrating the access control system for packet data network according to an embodiment of the present invention.

FIG. 8 is a block diagram illustrating the access control system for packet data network according to an embodiment of the present invention. As shown in FIG. 8, the access control system includes:

a BBERF entity 82, configured to send an indication of gateway control session establishment, wherein when a UE requests to access the same packet data network again after the UE accesses the packet data network, the BBERF entity carries a session identifier in the indication of gateway control session establishment; the session identifier is used for uniquely identifying an access of the UE at an access point name; and also configured to allocate the session identifier, to send a proxy binding update request message carrying the session identifier, to receive a gateway control session establishment acknowledge message, to acquire a quality of service rule and event trigger from the gateway control session establishment acknowledge message, and to install the quality of service rule and the event trigger;

a PCRF entity 84, connected with the BBERF entity 82, configured to receive the indication of gateway control session establishment from the BBERF entity, to acquire a session identifier from it, and to judge the connection reestablished by the UE to the access point name according to the session identifier; and also configured to receive an indication of internet protocol connectivity access network session establishment, to carry a session identifier in the indication of internet protocol connectivity access network session establishment, to associate the indication of gateway control session establishment with the indication of internet protocol connectivity access network session establishment according to the session identifier, to institute a policy and charging control rule, a quality of service rule and a corresponding event trigger according to the indication of gateway control session establishment, to send to the BBERF entity a gateway control session establishment acknowledge message, and to carry the quality of service rule and the event trigger in the gateway control session establishment acknowledge message.

Figure 9:
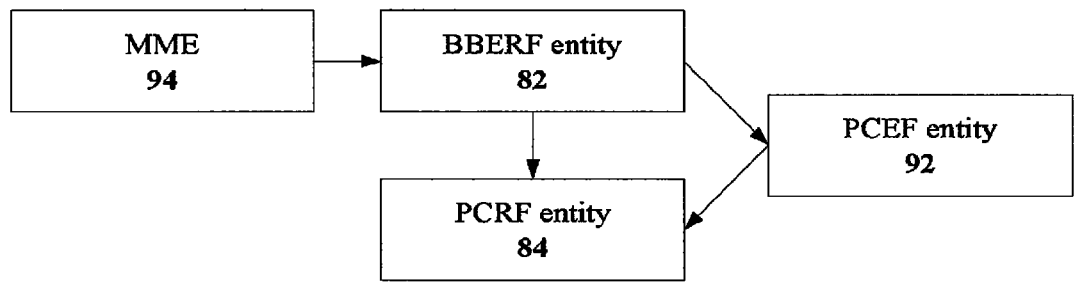
FIG. 9 is a block diagram illustrating a preferred structure of the access control system for packet data network according to an embodiment of the present invention.

FIG. 9 is a block diagram illustrating a preferred structure of the access control system for packet data network according to an embodiment of the present invention. As shown in FIG. 9, the above access control system for packet data network further includes:

a PCEF entity 92, connected with the BBERF entity 82 and the PCRF entity 84, configured to receive the proxy binding update request message from the BBERF entity, to send to the PCRF entity an indication of internet protocol connectivity access network session establishment, and to carry a session identifier in the indication of internet protocol connectivity access network session establishment;

a mobility management entity 94, connected with the BBERF entity 82, configured to allocate the session identifier, to send to the BBERF entity a default bearer establishment request message, and to carry the session identifier in the default bearer establishment request message.

Embodiment 2

Figure 10:
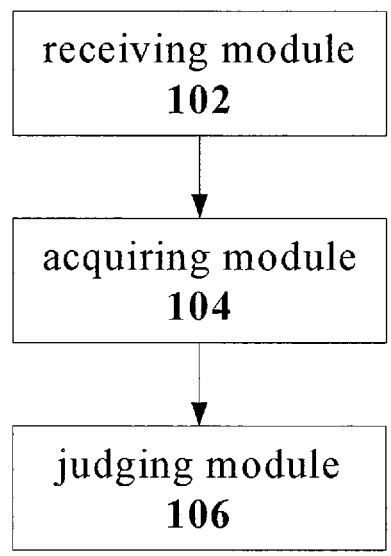
FIG. 10 is a block diagram illustrating the policy and charging rules function entity according to an embodiment of the present invention.

According to another aspect of the present invention, a policy and charging rules function entity is provided. FIG. 10 is a block diagram illustrating the policy and charging rules function entity according to an embodiment of the present invention. As shown in FIG. 10, the policy and charging rules function entity according to an embodiment of the present invention includes:

a receiving module 102, configured to receive an indication of gateway control session establishment from the bearer binding and event report function entity; wherein the indication of gateway control session establishment carries a session identifier which is used to identify whether a user equipment accesses the same packet data network again or the bearer binding and event report function entity relocation occurs;

an acquiring module 104, connected with the receiving module 102, configured to acquire the session identifier from the indication of control session establishment;

a judging module 106, connected with the acquiring module 104, configured to judge whether the user equipment accesses the same packet data network again or the bearer binding and event report function entity relocation occurs according to the session identifier.

In the above embodiments, a method for distinguishing different IP-CAN sessions is provided by carrying a session identifier in the indication of gateway control session establishment; the above method is applied in a packet system of 3GPP evolution, so that the PCRF may determine that a UE accesses the same APN for multiple times and uniquely identify different IP-CAN sessions when the UE accesses the same APN for multiple times.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. An access control method for packet data network, comprising:
a policy and charging rules function entity receiving an indication of gateway control session establishment from a bearer binding and event report function entity, wherein the indication of gateway control session establishment carries a session identifier, and the session identifier is used to identify whether a user equipment accesses the same packet data network again or the bearer binding and event report function entity relocation occurs;
the policy and charging rules function entity acquiring the session identifier from the indication of gateway control session establishment, and judging whether the user equipment accesses the same packet data network again or the bearer binding and event report function entity relocation occurs according to the session identifier;
wherein after the policy and charging rules function entity judging whether the user equipment accesses the same packet data network again or the bearer binding and event report function entity relocation occurs according to the session identifier, the method further comprises:
a gateway in which the bearer binding and event report function entity resides sending to a gateway in which a policy and charging enforcement function entity resides a proxy binding update request message carrying the session identifier;
the gateway in which the policy and charging enforcement function entity resides receiving the proxy binding update request message, the policy and charging enforcement function entity sending an indication of internet protocol connectivity access network session establishment to the policy and charging rules function entity, and carrying the session identifier in the indication of internet protocol connectivity access network session establishment;
the policy and charging rules function entity associating the indication of gateway control session establishment with the indication of internet protocol connectivity access network session establishment according to the session identifier.

2. The access control method according to claim 1, wherein the session identifier is also used for uniquely identifying an internet protocol connectivity access network session of the user equipment.

3. The access control method according to claim 2, wherein before the bearer binding and event report function entity sending the indication of gateway control session establishment, the method further comprises:
the bearer binding and event report function entity allocating the session identifier.

4. The access control method according to claim 3, wherein the information of the session identifier is added to an access point name; and the access point name carrying the information of the session identifier is used as the session identifier.

5. The access control method according to claim 3, wherein when the user equipment accesses a packet data network for the first time or reestablishes the first access to the packet data network, the indication of gateway control session establishment does not carry the session identifier.

6. The access control method according to claim 2, wherein before the bearer binding and event report function entity sending the indication of gateway control session establishment, the method further comprises:
a mobility management entity allocating the session identifier;
the mobility management entity sending a default bearer establishment request message to the bearer binding and event report function entity, and carrying the session identifier in the default bearer establishment request message.

7. The access control method according to claim 6, wherein a default bearer identifier is used as the session identifier.

8. The access control method according to claim 7, wherein when the user equipment accesses a packet data network for the first time or reestablishes the first access to the packet data network, the indication of gateway control session establishment does not carry the session identifier.

9. The access control method according to claim 6, wherein the information of the session identifier is added to an access point name; and the access point name carrying the information of the session identifier is used as the session identifier.

10. The access control method according to claim 6, wherein when the user equipment accesses a packet data network for the first time or reestablishes the first access to the packet data network, the indication of gateway control session establishment does not carry the session identifier.

11. The access control method according to claim 2, wherein when the user equipment accesses a packet data network for the first time or reestablishes the first access to the packet data network, the indication of gateway control session establishment does not carry the session identifier.

12. The access control method according to claim 1, wherein after the policy and charging rules function entity judging whether the user equipment accesses the same packet data network again or the bearer binding and event report function entity relocation occurs according to the session identifier, the method further comprises:
    based on the indication of gateway control session establishment, the policy and charging rules function entity instituting a policy and charging control rule, a quality of service rule and a corresponding event trigger, sending a gateway control session establishment acknowledge message to the bearer binding and event report function entity, and carrying the quality of service rule and the event trigger in the gateway control session establishment acknowledge message;
    the bearer binding and event report function entity receiving the gateway control session establishment acknowledge message, acquiring the quality of service rule and the event trigger from the gateway control session establishment acknowledge message, and installing the quality of service rule and the event trigger.

13. The access control method according to claim 12, wherein when the user equipment accesses a packet data network for the first time or reestablishes the first access to the packet data network, the indication of gateway control session establishment does not carry the session identifier.

14. The access control method according to claim 1, wherein when the user equipment accesses a packet data network for the first time or reestablishes the first access to the packet data network, the indication of gateway control session establishment does not carry the session identifier.

15. The access control method according to claim 1, wherein before the policy and charging rules function entity receiving an indication of gateway control session establishment from a bearer binding and event report function entity, the method further comprises:
    based on a packet data network connection request message of the user equipment, the bearer binding and event report function entity sending the indication of gateway control session establishment to the policy and charging rules function entity.

16. The access control method according to claim 1, wherein when the user equipment accesses a packet data network for the first time or reestablishes the first access to the packet data network, the indication of gateway control session establishment does not carry the session identifier.

17. An access control method for packet data network, comprising:
    a bearer binding and event report function entity sending an indication of gateway control session establishment to a policy and charging rules function entity, wherein the indication of gateway control session establishment carries a session identifier, the session identifier is used to uniquely identify a internet protocol connectivity access network session of a user equipment;
    a gateway in which the bearer binding and event report function entity resides sending a proxy binding update request message to a gateway in which the policy and charging enforcement function entity resides, and carrying the session identifier in the proxy binding update request message;
    the gateway in which the policy and charging enforcement function entity resides receiving the proxy binding update request message, the policy and charging enforcement function entity sending an indication of internet protocol connectivity access network session establishment or an indication of internet protocol connectivity access network session modification to the policy and charging rules function entity, and carrying the session identifier in the indication of internet protocol connectivity access network session establishment or the indication of internet protocol connectivity access network session modification;
    the policy and charging rules function entity associating the indication of gateway control session establishment with the indication of internet protocol connectivity access network session establishment or the indication of internet protocol connectivity access network session modification according to the session identifier.

18. An access control system for packet data network, comprising:
    a bearer binding and event report function entity, configured to send an indication of gateway control session establishment to a policy and charging rules function entity, and to carry a session identifier in the indication of gateway control session establishment, wherein the session identifier is used to uniquely identify a internet protocol connectivity access network session of a user equipment; a gateway in which the bearer binding and event report function entity resides, configured to send a proxy binding update request message to a gateway in which the policy and charging enforcement function entity resides, and to carry the session identifier in the proxy binding update request message; the gateway in which the policy and charging enforcement function entity resides, configured to receive the proxy binding update request message; the policy and charging enforcement function entity, configured to send an indication of internet protocol connectivity access network session establishment or an indication of internet protocol connectivity access network session modification to the policy and charging rules function entity, and to carry the session identifier in the indication of internet protocol connectivity access network session establishment or the indication of internet protocol connectivity access network session modification; the policy and charging rules function entity, configured to receive the indication of gateway control session establishment from the bearer binding and event report function entity and the indication of internet protocol connectivity access network session establishment or the indication of internet protocol connectivity access network session modification from the policy and charging enforcement function entity, and to associate the indication of gateway control session establishment with the indication of internet protocol connectivity access network session establishment or the indication of internet protocol connectivity access network session modification according to the session identifier.

* * * * *